United States Patent [19]

Fiete et al.

[11] Patent Number: 5,166,506
[45] Date of Patent: Nov. 24, 1992

[54] METHOD FOR DETERMINING AN IMAGING SYSTEM FOCUS ERROR

[75] Inventors: Robert D. Fiete, Fairport; Joel K. Mason, Rochester; Philip F. Marino, Rochester; Edward M. Granger, Rochester, all of N.Y.

[73] Assignee: Eastman Kodak Company, Rochester, N.Y.

[21] Appl. No.: 648,507

[22] Filed: Jan. 30, 1991

[51] Int. Cl.$^5$ .............................................. G01J 1/20
[52] U.S. Cl. .................................. 250/201.7; 354/407
[58] Field of Search ............... 250/201.7, 201.2, 201.3, 250/561; 354/406, 407, 408; 356/4

[56] References Cited

U.S. PATENT DOCUMENTS

| | | | |
|---|---|---|---|
| 4,341,953 | 7/1982 | Sakai et al. | 250/201.7 |
| 4,460,989 | 7/1984 | Russell | 250/201.7 |
| 4,540,881 | 9/1985 | Hayashi et al. | 354/406 |
| 4,621,191 | 11/1986 | Suzuki et al. | 354/406 |
| 4,633,075 | 12/1986 | Sakai et al. | 250/201.7 |

*Primary Examiner*—David C. Nelms
*Attorney, Agent, or Firm*—Stephen C. Kaufman

[57] ABSTRACT

A method for determining a radiation imaging system focus error, that employs a novel focus sensor. In a preferred embodiment, the novel focus sensor comprises two beamsplitters, a spacer, and three detectors comprising CCD arrays. The three detectors are constrained to satisfy radiation path length specifications, with respect to the beamsplitters and spacer. In the method, the focus sensor may be aligned in an unused portion of an imaging system radiation field. The detectors simultaneously image the same scene, sampling it at three different focus positions. The sampling action becomes a basis for generating a parabolic curve; a maximum of the parabolic curve is a measure of the imaging system focus error.

13 Claims, 4 Drawing Sheets

METHOD FOR DETERMINING AN IMAGING SYSTEM FOCUS ERROR

CROSS REFERENCE TO A RELATED APPLICATION

This application is related to a U.S. Pat. application Ser. No. 07/647,873 filed Jan. 30, 1991 by Mason et al. The entire disclosure of this application is incorporated by reference herein. This application is copending and commonly assigned.

FIELD OF THE INVENTION

This invention relates to a method for determining an imaging system focus error.

INTRODUCTION TO THE INVENTION

A canonical imaging system that may be used to explain the concept of an imaging system focus error, is shown in FIG. 1.

The FIG. 1A imaging system 10 comprises a conventional lens 12. Radiation rays 14, which represent parallel incident radiation beams from a fixed and infinite object point 16, are reflected by the lens 12 and converge to a focus F at a focal Point 18. The focal point 18 is a sub-set of a focal plane 20 which intersects the focal point 18.

By definition, the focal point 18 is the image of the fixed and infinite object point 16. Accordingly, if a radiation detector 22, for example (and where appropriate), a photographic film, is placed coincident with the focal plane 20, the image of the fixed object point 16 at an imaging plane 24 defined by the radiation detector 22, can be sharply developed by the radiation detector 22.

In summary, the FIG. 1A imaging system 10 has been so constructed (i.e., with the focal plane 20 coincident with the imaging plane 24) that it does not introduce focus error: it is in-focus. An indicia of this desired condition is that the fixed and infinite object point 16 can be sharply developed, i.e., without undue blurs, fuzziness or other degradations of the image.

Attention is now directed to FIG. 1B, which shows a first modification of the FIG. 1A imaging system 10, so that a first out-of-focus condition can be demonstrated. Here, the imaging plane 24 has been physically displaced, by a distance D, from the focal plane 20. The physical displacement D corresponds to an introduction of focus error, and thus introduces a "sensible" and undesirable degradation of the image quality of the object point 16.

Attention is now directed to FIG. 1C, which shows a second modification of the FIG. 1A imaging system 10, so that a second out-of-focus condition can be demonstrated. Here, the focal plane 20 is still coincident with the imaging plane 24, but the heretofore fixed and infinite object point 16 has been displaced so that it is now located at a finite distance from the imaging system 10. This relocation action induces an out-of-focus condition, D, thereby introducing a sensible and undesirable image degradation.

Note, although not shown in FIG. 1, that an out-of-focus condition can also be induced by inter alia: changes in the lens 12 curvature, or temperature gradients incurred by the imaging system 10. In all cases, it is desired to determine a focus error for an out-of-focus condition, so that the imaging system can be efficiently restored to the in-focus state, thus providing sharp images of an object.

SUMMARY OF THE INVENTION

The concept and the problem of focus, as defined above, are known, at least in a theoretical way. The necessity for its satisfactory solution remains, however, especially, and in particular, when the following constraints may be superimposed on a solution: --

1. a determination of focus error is to be done in real time;
2. a determination of focus error is to be done automatically;
3. a determination of focus error is to be done non-iteratively; and/or
4. a determination of focus error is to be done with great quantitative precision.

We have now discovered a novel method for determining an imaging system focus error. Important advantages of the novel method are that its use addresses and accommodates the problem of focus error, so that one is enabled to satisfy the above-listed constraints, namely: --

1) the determination of focus error can be done in real time, so that one can look at moving objects;
2) the determination of focus error can be done automatically, i.e., without human intervention;
3) the determination of focus error can be done non-iteratively; and
4) the determination of focus error can be done with great quantitative precision, for example, a determination of focus error D within thousandths of an inch; and, for an exceptionally broad and dynamic range of object distances, essentially, infinite.

The present invention, accordingly, discloses a method for determining an imaging system focal error, the imaging system inputting a scene radiation field and re-imaging it at an ideal focal point, the method comprising the steps of:

1) positioning a sensor in a portion of the radiation field, the sensor including elements comprising:
   a) a first beamsplitter comprising an input scene radiation surface, and a first and a second output surface;
   b) a second beamsplitter located in a radiation path generated by the first output surface of the first beamsplitter, and comprising an input radiation surface, and a first and a second output surface;
   c) a first radiation detector located in a radiation path generated by the first output surface of the second beamsplitter, and defining a known radiation path length $D_1$ as measured from the input surface of the first beamsplitter;
   d) a second radiation detector located in a radiation path generated by the second output surface of the second beamsplitter, and defining a known radiation path length $D_2$, as measured from the input surface of the first beamsplitter; and
   e) a third radiation detector located in a radiation path generated by the second output surface of the first beamsplitter, defining a known radiation path length $D_3$, as measured from the input surface of the first beamsplitter;
   the elements so constrained that:

$D_1 \neq D_2 \neq D_3 \neq D_1$;

2) orienting the sensor so that the three radiation detectors each simultaneously image the same scene radiation field, for sampling it at three different focus positions $D_1$, $D_2$, $D_3$;

3) sampling the input scene radiation field at focus positions $D_1$, $D_2$, $D_3$, for recording, respectively, three independent focal signatures, where each focal signature is a function of radiation intensity and position with respect to each of the three radiation detectors; and 4) determining the imaging system focal error by
   a) generating a focal error parabolic function by specifying at least three independent parameters derived from step 3; and
   b) computing a parabolic function maximum as a measure of imaging system focal error.

BRIEF DESCRIPTION OF THE DRAWING

The invention is illustrated in the accompanying drawing, in which.

DETAILED DESCRIPTION OF THE INVENTION

We summarize above a novel sensor suitable for determining focus error. Preferred and alternative embodiments of such a sensor are first disclosed, by way of FIGS. 2-4, followed by a recital of its operation in a preferred method for determining focus error.

Figure 1A:
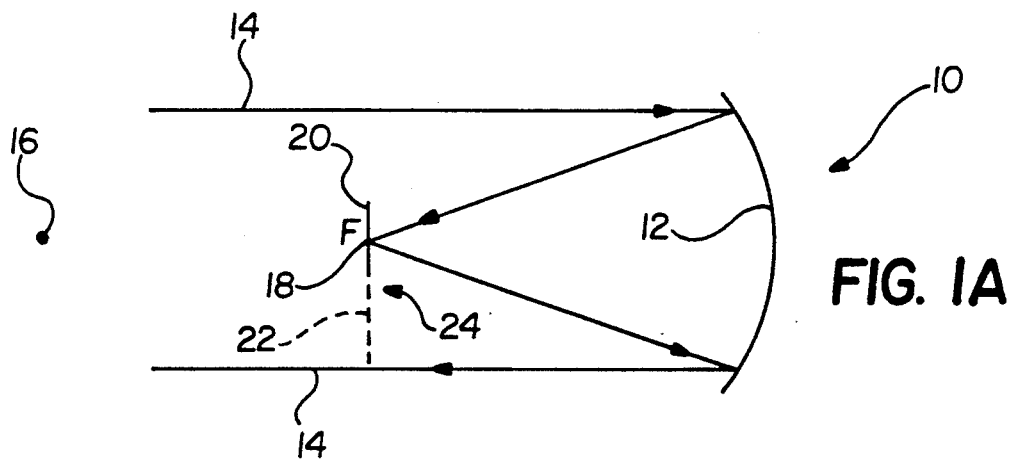
FIGS. 1A-C show a canonical imaging system that is used to explain the concept of focus error.
Figure 1B:
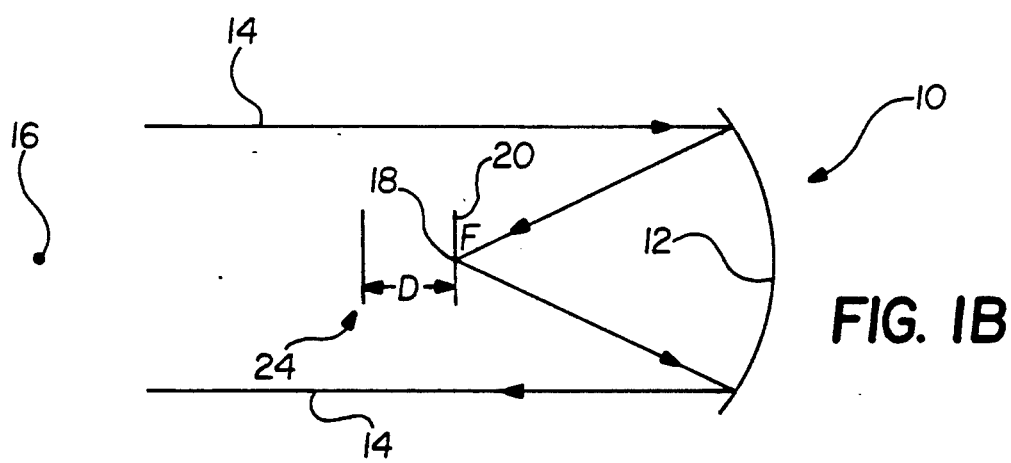
Figure 1C:
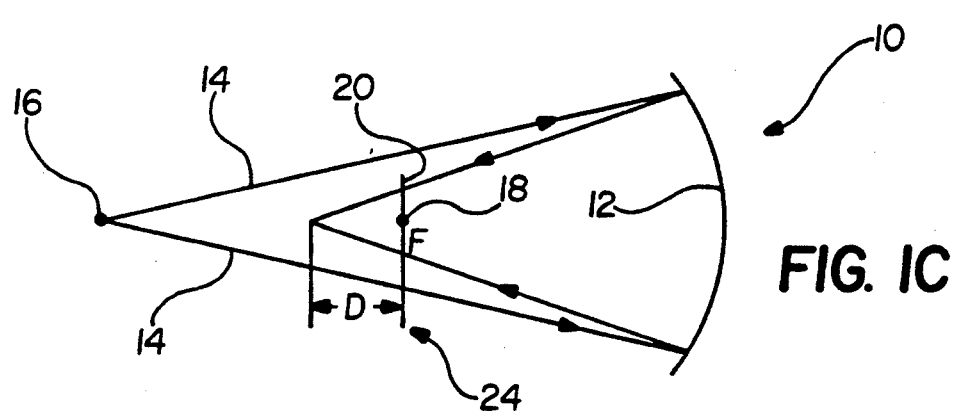
Figure 2:
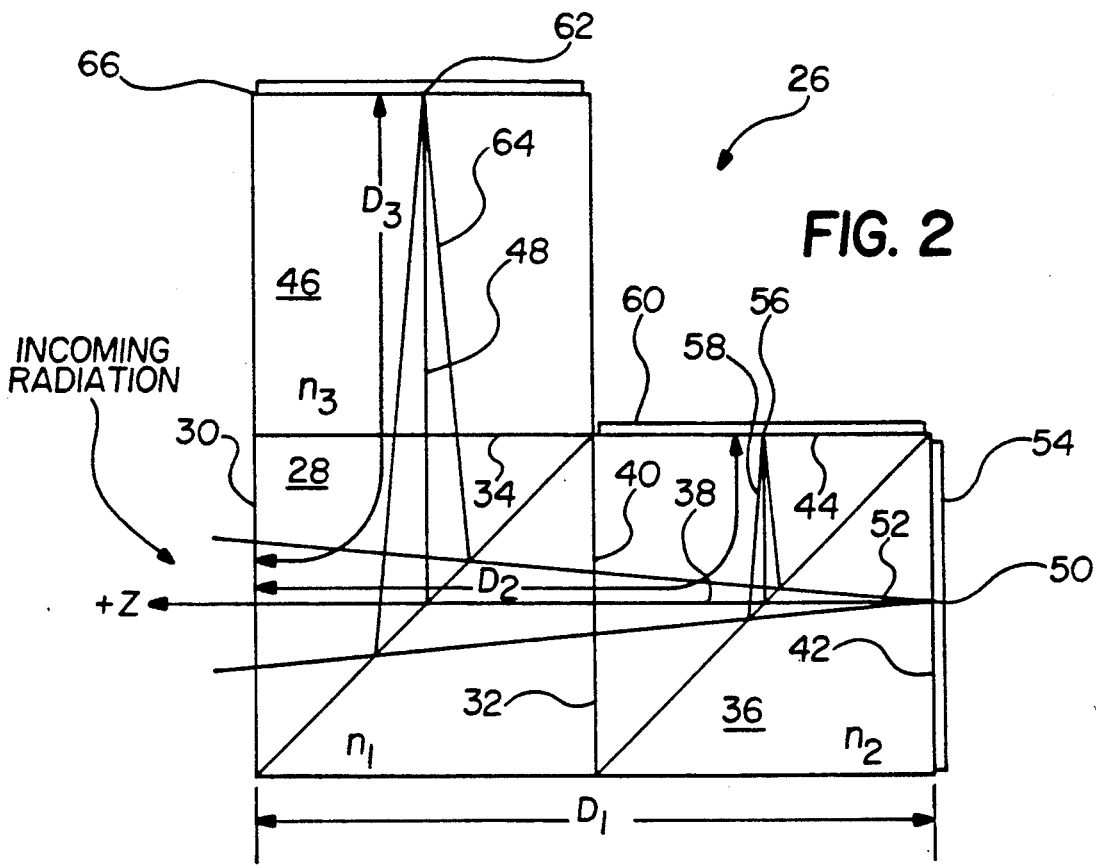
FIG. 2 shows a novel sensor of the present invention.

FIG. 2, accordingly, shows a preferred sensor 26 of the present invention. The FIG. 2 sensor 26 includes the following elements: --

1) A first conventional beamsplitter 28 comprising an input scene radiation surface 30, and first and second output surfaces 32, 34. The first beamsplitter 28 preferably has an index of refraction $n_1$, $n_1 = 1.5$, and preferably has a reflection/transmission ratio 33%/67%.

2) A second conventional beamsplitter 36 located in a transmission radiation path 38 generated by the first beamsplitter 28, and comprising an input radiation surface 40, and first and second output surfaces 42, 44. The second beamsplitter 36 preferably has an index of refraction $n_2$, $n_2 = 1.5$, and preferably has a reflection/transmission ratio 50%/50%. The second beamsplitter 36 is preferably bonded to the first beamsplitter 28 by a conventional means, for example, a conventional adhesive or an optical cement.

3) A conventional spacer 46 having an index of refraction $n_3$, where preferably $n_3 = 1.5$, and comprising, for example, homogeneous glass or quartz or plastic. The spacer 46 is preferably physically positioned (e.g., glued) adjacent the output surface 34 of the first beamsplitter 28, and aligned along a reflection path 48 generated by the first beamsplitter 28.

The FIG. 2 sensor 26 also includes the following elements: --

4) A first radiation detector preferably comprising a conventional CCD array 50. The CCD array 50 is located in a transmission radiation path 52 generated by the second beamsplitter 36. In particular, the CCD array 50 is preferably attached to the first output surface 42 by a conventional means, e.g., an adhesive. Note that the CCD array 50 defines an imaging plane 54, which imaging plane 54 intersects an "ideal focus" (i.e., conjugate to a system prime focus) formed by the converging transmission radiation path 52. Note furthermore that a known radiation path length $D_1$ can be measured from the input surface 30 of the first beamsplitter 28, to the first radiation detector comprising the CCD array 50.

5) A second radiation detector preferably comprising a conventional CCD array 56. The CCD array 56 is located in a reflection radiation path 8 generated by the second beamsplitter 36. In particular, the CCD array 56 is preferably attached to the second output surface 44 be a conventional means, e.g., a glue. Note that the CCD array 56 defines an imaging plane 60, which imaging plane 60 intersects an "ideal focus-0.035 inches" formed by the converging radiation path 58. Note furthermore that a known radiation path length $D_2$ ($D_2 \neq D_1$) can be measured from the input surface 30 of the first beamsplitter 28, to the second radiation detector comprising the CCD array 56.

6) A third radiation detector preferably comprising a conventional CCD array 62. The CCD array 62 is located in a reflection radiation path 64 generated by the first beamsplitter 28. In particular, the CCD array 62 is preferably attached by a conventional means to an edge of the spacer 46. Note that the CCD array 62 defines an imaging plane 66, which imaging plane 66 intersects an "ideal focus + 0.035 inches" formed by the converging radiation path 64. Note furthermore that a known radiation path length $D_3$ ($D_3 \neq D_2 \neq D_1$) can be measured from the input surface 30 of the first beamsplitter 28, to the third radiation detector comprising the CCD array 62.

FIG. 2, in summary, shows a preferred sensor 26 of the present invention. The sensor 26 comprises two beamsplitters (28, 36), a spacer 46, and three radiation detectors comprising the CCD arrays (50, 56, 62). The sensor 26, moreover, defines three known radiation path lengths $D_1$, $D_2$, $D_3$, and requires that $D_1 \neq D_2 \neq D_3 \neq D_1$.

The FIG. 2 radiation path lengths $D_3$, $D_2$, $D_2$ can each be expressed in accordance with an equation (1):

$$\text{radiation path length} = \sum_{\substack{\text{each} \\ \text{element}}} \left( \begin{array}{c} \text{index of} \\ \text{refraction} \end{array} \times \begin{array}{c} \text{physical} \\ \text{length} \end{array} \right). \quad (1)$$

Figure 3:
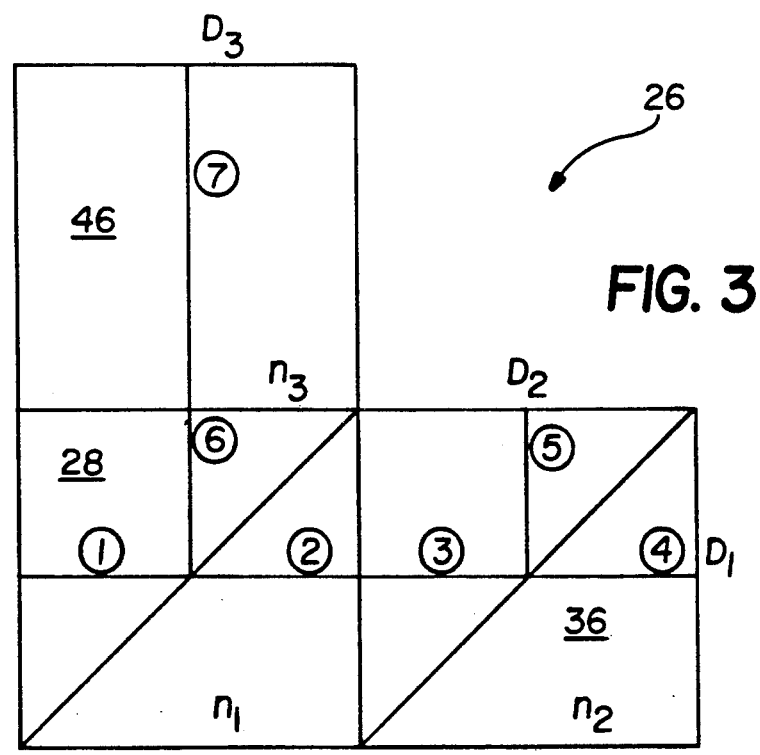
FIG. 3 is a redrawing of the FIG. 2 sensor, provided to isolate operational constraints.

Thus, as shown in FIG. 3, which summarizes the FIG. 2 path lengths, the radiation path lengths (RPL) for the sensor 26 can be developed as follows:

$$RPL_{D_1} n_1 \textcircled{1} + n_1 \textcircled{2} + n_2 \textcircled{3} + n_2 4 \quad (2)$$

$$RPL_{D_2} n_1 \textcircled{1} + n_1 \textcircled{2} + n_2 \textcircled{3} + n_2 5 \quad (3)$$

$$RPL_{D_3} n_1 \textcircled{1} + n_1 \textcircled{6} + n_3 \textcircled{7} \quad (4)$$

where, $$RPL_{D_1} \neq RPL_{D_2} \neq RPL_{D_3} \neq RPL_{D_1} \quad (5)$$

and, $$RPL_{D_1}, RPL_{D_2}, RPL_{D_3} \text{ are all known} \quad (6).$$

In overview, alternative embodiments of the FIGS. 2, 3 sensor 26 comprise structural and functional changes which leave known radiation path lengths ($RPL_{D_1}$, $RPL_{D_2}$, $RPL_{D_3}$)

and their required inequalities (as generally expressed in equations (1)-(6)), invariant. Thus, it may be understood that there are a potentially infinite number of structural and functional changes which can be made to the sensor 26, while respecting the invariance constraints. For example, one can change indices of refraction ($n_1$, $n_2$, $n_3$) of one, two or three of the beamsplitters (28, 36) and spacer 46, while simultaneously adjusting their physical lengths or adding new spacers, all in accordance with equations (2)-(4). Or, one can leave the indices of refraction ($n_1$, $n_2$, $n_3$) as originally specified, but proportionately change the physical lengths (①, ②, ③, ④, ⑤, ⑥, ⑦) of each of the beamsplitters, or add new spacers. Or, one can substitute diffraction gratings, in lieu of the beamsplitters (28, 36).

Figure 4A:
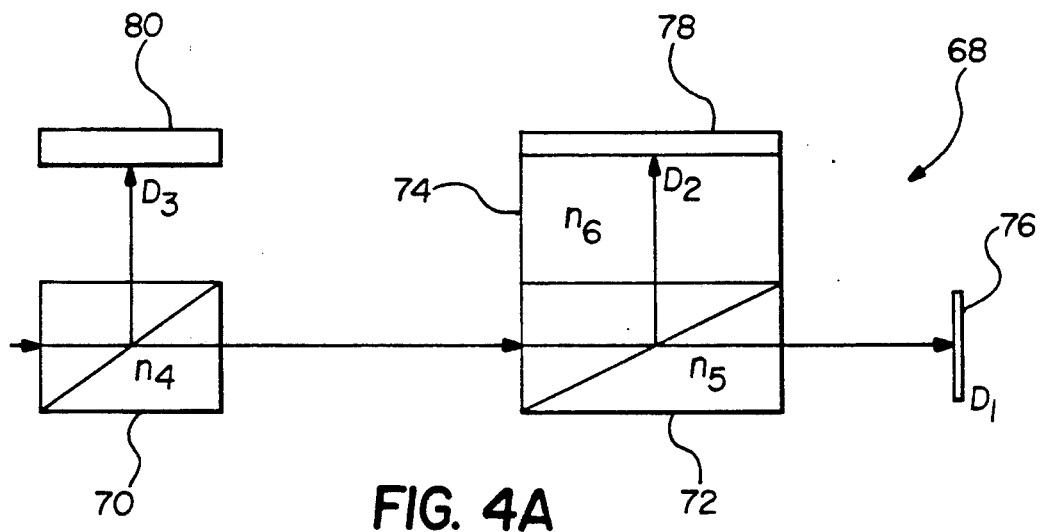
FIGS. 4A, B show alternative embodiments of the sensor of the present invention.

Attention is now directed to FIGS. 4A, B, which illustrate alternative embodiments of the FIG. 2 sensor 26.

FIG. 4A shows a sensor 68 comprising a pair of conventional beamsplitters 70, 72, a conventional plastic spacer 74, and three photographic films (76, 78, 80). Path lengths $D_1$, $D_2$, $D_3$ are also shown, and are required to satisfy the equations (1)-(6), supra.

The FIG. 4A sensor 68, compared to the FIG. 2 sensor 26, includes the following changes:

1) the beamsplitters 70, 72 are separated by a spacer (air);

2) the films (76, 78, 80) are all separated by spacers (either air, or the spacer 74) from the beamsplitters 70, 72;

3) the indices of refraction are now $n_4$, $n_5$, $n_6$, air; and 4) the radiation detectors (76, 78, 80) comprise photographic film.

The FIG. 4A embodiment emphasizes a versatility in design and utility in constructing the sensor of the present invention, and in readily adapting it to methods for determining focus error.

Figure 4B:
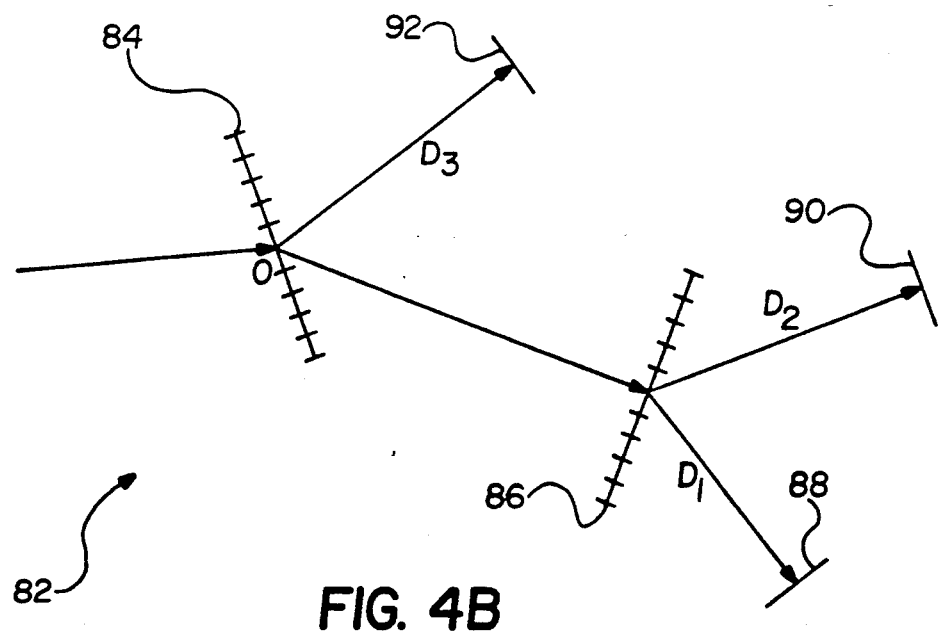

Attention is now directed to FIG. 4B, which shows a sensor of the present invention in a second alternative embodiment. A FIG. 4B sensor 82 comprises first and second diffraction gratings 84, 86 and three CCD arrays (88, 90, 92). Path lengths $D_1$, $D_2$, $D_3$ originating from a point 0 are also shown, and are required to satisfy the equations (1), (5), (6), supra. The sensor 82 is preferably used when it is desired to determine focus error, and the input radiation comprises radiation in the microwave spectrum.

We have now disclosed preferred and alternative embodiments of a novel sensor that is preferably employed in the method for determining focus error, as summarized above.

Figure 5:
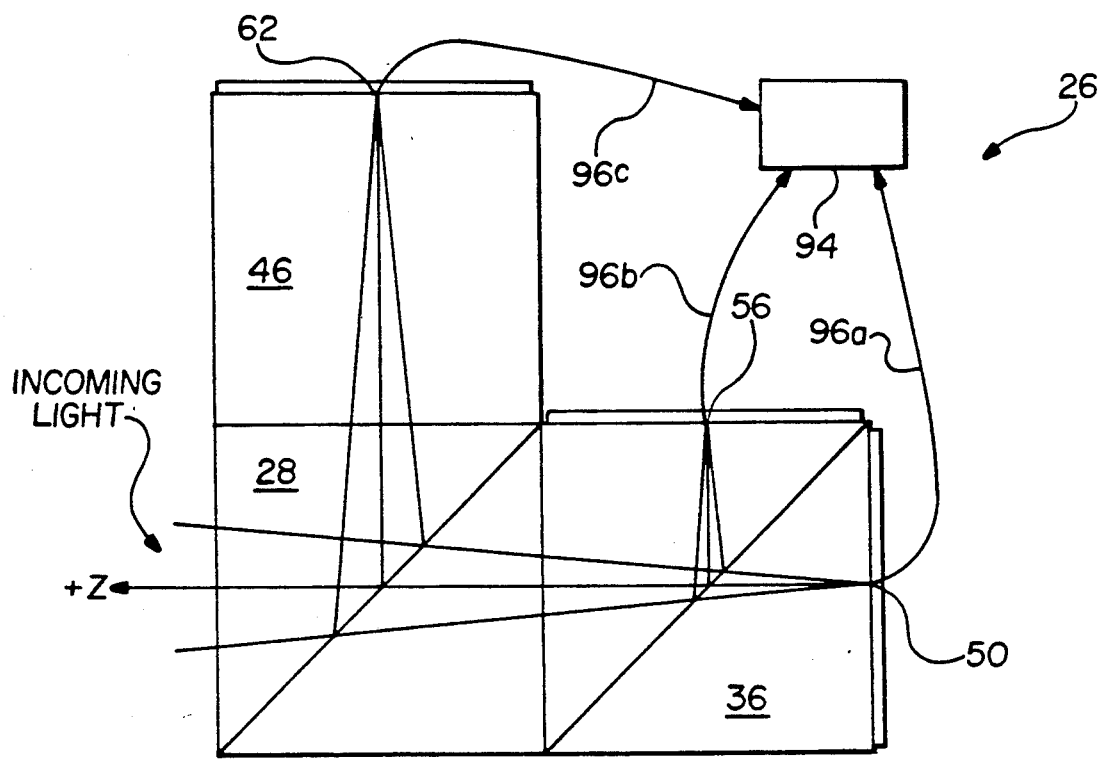
FIG. 5 shows an imaging system that can demonstrate a utility of a sensor of the present invention.

An example of the method is now disclosed, by way of FIG. 5. FIG. 5 shows the FIG. 2 sensor 26 located in an optical radiation field The FIG. 2 sensor 26 has been adapted to provide inputs to a conventional image processing computer 94. The computer 94 receives inputs from the three CCD arrays (50, 56, 62) along lines 9a, b, c, respectively.

FIG. 5 also shows the sensor 26 orientation, in particular, the fact that the CCD array 50 is located at ideal focus, i.e., conjugate to a system prime focus, and that the CCD arrays 56, 62 are located a distance epsilon $\epsilon$ on either side of ideal focus. Here, by way of example only, $\epsilon = \pm 0.035$ inches.

In operation, the image processing computer 94 simultaneously acquires image information from the three CCD arrays (50, 56, 62). This image information corresponds to simultaneously sampling the input scene radiation at three different focus positions. (This condition is insured by the constraint $D_1 \neq D_2 \neq D_3 \neq D_1$ elaborated above.) The image information, moreover, corresponds to generating three independent focal signatures, i.e., data corresponding to radiation intensity (I) versus pixel position (P) in the CCD array, for each of the three CCD arrays (50, 56, 62).

Figure 6:
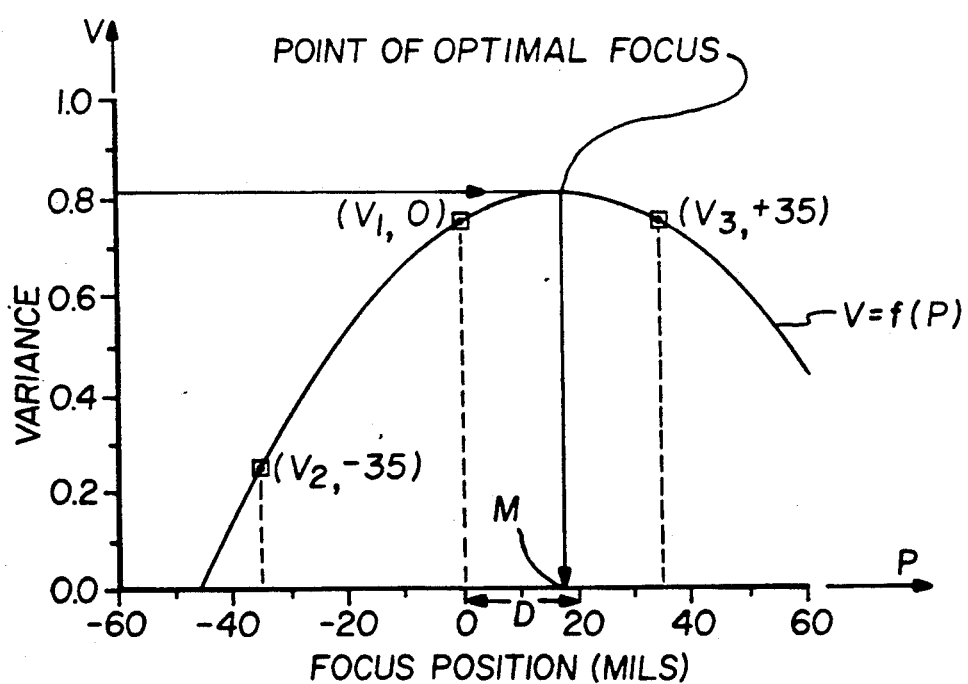
FIG. 6 shows a parabolic function generated by utilization of a sensor of the present invention.

To the end of determining the imaging system focus error, finally, the image processing computer 94 preferably computes a respective value ($V_1$, $V_2$, $V_3$) for the statistical variance (V) for each CCD array, and plots variance (V) as a function of CCD array position (P), expressed in mils. An action of curve fitting the variance points (($V_1$, 0), ($V_2$, $-35$), ($V_3$, $+35$)); and results in a parabolic function (V = F(f)) of variance as a function of image plane position along the optical axis, as shown in FIG. 6. A parabolic function maximum (M) is a desired quantitative measure of the imaging system focus error, D. In more detail, the parabolic maximum is the location of optimal focus. The optical imaging system focus error is the difference between the optimal focus location and its displacement D from the imaging plane.

Note that in alternative embodiments of the method, it is possible to:

(1) compute other statistical moments besides variance, for example, standard deviation;

(2) employ greater than three CCD arrays, thus refining the parabolic curve fitting action; and/or (3) orient the sensor 26 so that the CCD arrays are located at any arbitrary but known locations vis a vis the input scene radiation field, provided its internal radiation path length constraints ($D_1$, $D_2$, $D_3$), are satisfied.

What is claimed is:

1. A method for quantitatively determining an imaging system focus error, the imaging system inputting a scene radiation field and re-imaging it at an ideal focal point, the method comprising the steps of:

1) providing a sensor, the sensor including elements comprising:

a) a first beamsplitter comprising an input scene radiation surface, and a first and second output surface;

b) a second beamsplitter located to be in a radiation path generated by the first output surface of the first beamsplitter, and comprising an input radiation surface, and a first and a second output surface;

c) a first radiation detector located to be in a radiation path generated by the first output surface of the second beamsplitter, and defining a first imaging surface located at a known radiation path length $D_1$ as measured from the input surface of the first beamsplitter;

d) a second radiation detector located to be in a radiation path generated by the second output surface of the second beamsplitter, and defining a second imaging surface located at a known radiation path length $D_2$, as measured from the input surface of the first beamsplitter; and e) a third radiation detector located to be in a radiation path generated by the second output surface of the first beamsplitter, defining a third imaging surface located at a known radiation path length $D_3$, as measured from the input surface of the first beamsplitter;

the elements so constrained that:

$D_1 \neq D_2 \neq D_3 \neq D_1$;

2) positioning the sensor in a portion of the input scene radiation field, and orienting the sensor so that the three radiation detectors each simultaneously image the same scene radiation field, for sampling it at the three different imaging surfaces;

3) sampling the input scene radiation field at the first, second and third imaging surfaces, for recording, respectively, data corresponding to the radiation intensity of the sampled field at different points on each of the three imaging surfaces; and 4) determining, from the recorded data, a value of a parameter representative of a statistical distribution of intensity vs. surface point position of the sampled field for each of the three imaging surfaces;

b) generating a parabolic function of value of the parameter vs. imaging surface location by curve fitting to three points specified by the three imaging surface locations and the respective parameter values derived for the three imaging surfaces from step 4a;

c) computing a location of an optimal imaging surface, corresponding to a maximum value of the parameter for the parabolic function, the computed optimal imaging surface location serving as a measure of the magnitude and direction of the imaging system focus error.

2. A method according to claim 1, wherein step 2 comprises positioning the sensor so that one of the radiation detectors is located conjugate to the imaging system prime focus.

3. A method according to claim 1, wherein the parameter determined in step 4 comprises a parameter representative of a variance magnitude.

4. A method according to claim 1, wherein step 4 comprises determining the imaging system focal error in real time with the sensor in a single fixed position.

5. A method for real time, automatic quantitative determination of distance and direction of displacement along an optical axis of the position of an in-focus image of an input scene radiation field focused by a radiation imaging system, from the position of a predetermined ideal focus point of the system, the method comprising the steps of:

dividing the input scene radiation field into first, second and third scene radiation field paths using beamsplitters;

simultaneously sampling the input scene radiation field along the first, second and third paths, using first, second and third radiation detectors defining first, second and third imaging planes respectively located at the ideal focus point, a distance epsilon $\epsilon$ short of the ideal focus point, and a distance epsilon $\epsilon$ beyond the ideal focus point;

computing a value of statistical variance based on intensity of the input scene radiation field sampled at different points in the imaging plane for each of the first, second and third imaging planes;

deriving a parabolic function of variance versus image plane location which fits the points defined by the values of statistical variance computed for each of the first, second and third image plane locations; and from the derived parabolic function, determining the distance and direction, from the first image plane location, of the image plane location that corresponds to the point of maximum variance on the parabolic function curve; the determined distance and direction representing the distance and direction of displacement of the position of the in-focus image from the position of the ideal focus point.

6. A method as in claim 5, wherein the dividing step comprises dividing the field into the combined first and second paths and the third path using a first beamsplitter, and dividing the combined first and second paths into separate first and second paths using a second beamsplitter.

7. A method as in claim 6, wherein the field is divided so that the first path comprises a transmission radiation path of the first beamsplitter, followed by a transmission radiation path of the second beamsplitter.

8. A method as in claim 7, wherein the field is divided so that the second path comprises a transmission radiation path of the first beamsplitter, followed by a reflection radiation path of the second beamsplitter; and the third path comprises a reflection radiation path of the first beamsplitter.

9. A method as in claim 8, wherein the field is divided so that the third path further comprises the reflection radiation path of the first beamsplitter, followed by a path through a spacer.

10. A method as in claim 6, wherein the first beamsplitter has a reflection/transmission ratio of 33%/67%, and the second beamsplitter has a reflection/transmission ratio of 50%/50%.

11. A method as in claim 5, wherein the first, second and third detectors comprise first, second and third CCD arrays.

12. A method as in claim 5, wherein the second detector defines a second imaging plane located at 0.035 inches short of the ideal focus point along the second path, and the third detector defines a third imaging plane located at 0.035 inches beyond the ideal focus point along the third path.

13. A method for real time, automatic quantitative determination of distance and direction of displacement along an optical axis of the position of an in-focus image of an input scene radiation field focused by a radiation point of the system, the method comprising the steps of:

dividing the input scene radiation field into first, second and third scene radiation field paths using beamsplitters;

simultaneously sampling the input scene radiation field along the first, second and third paths, using first, second and third radiation detectors defining first, second and third imaging planes respectively located at different first, second and third known distances from the reference point of the system;

computing a value of statistical variance based on intensity of the input scene radiation field sampled at different points in the imaging plane for each of the first, second and third imaging planes;

deriving a parabolic function of variance versus image plane location which fits the points defined by the values of statistical variance computed for each of the first, second and third image plane locations; and from the derived parabolic function, determining the distance and direction, from the reference point location, of the image plane location that corresponds to the point of maximum deviation on the parabolic function curve; the determined distance and direction representing the distance and direction of displacement of the position of the in-focus image from the position of the reference point.

* * * * *